United States Patent [19]

Pickert

[11] Patent Number: 5,465,397
[45] Date of Patent: Nov. 7, 1995

[54] METHOD AND APPARATUS FOR SELECTING THE BEST FIXED COMMUNICATION UNIT

[75] Inventor: William F. Pickert, Hoffman Estates, Ill.

[73] Assignee: Motorola, Inc., Schaumburg, Ill.

[21] Appl. No.: 361,899

[22] Filed: Dec. 22, 1994

Related U.S. Application Data

[63] Continuation of Ser. No. 35,109, Mar. 19, 1993, abandoned.

[51] Int. Cl.$^6$ .................................................. H04B 15/00
[52] U.S. Cl. ...................... 455/62; 455/56.1; 455/161.3; 379/61
[58] Field of Search ................................. 455/33.1, 33.2, 455/33.4, 34.2, 54.1, 54.2, 58.2, 62, 88, 161.3; 379/59–60, 61

[56] References Cited

U.S. PATENT DOCUMENTS

| | | | |
|---|---|---|---|
| 4,654,867 | 3/1987 | Labedz et al. | 379/59 |
| 4,918,437 | 4/1990 | Jasinski et al. | 455/33.4 |
| 5,008,953 | 4/1991 | Dahlin | 455/54.1 |
| 5,027,431 | 6/1991 | Tanaka et al. | 455/161.3 |
| 5,128,959 | 7/1992 | Bruckert | 455/33.2 |
| 5,162,790 | 11/1992 | Jasinski et al. | 340/825.44 |

FOREIGN PATENT DOCUMENTS 0139034  7/1985  Japan .................................. 455/56.1

*Primary Examiner*—Reinhard J. Eisenzopf
*Assistant Examiner*—Andrew Faile
*Attorney, Agent, or Firm*—Keith A. Chanroo

[57] ABSTRACT

A portable communication unit (120) capable to communicating on a plurality of communication channels. The portable communication unit (120) includes a method for selecting one of an at least two fixed communication units (102) for communicating therewith. The method comprises the steps of (a) transmitting communication link requests (602); (b) receiving link grant responses (608) from the fixed communication units receiving the communication link requests; (c) transmitting wait signals (610) for delaying communication to the fixed communication units (102) responding to the communication link requests; (d) measuring and storing signal strengths (614) of the link responses received from the fixed communication units (102) responding to the communication link requests; (e) selecting the fixed communication unit (620) having a maximum measured received signal strength of the link grant response; and (f) initiating communication (630) with the fixed communication unit (102) having the maximum received signal strength.

17 Claims, 4 Drawing Sheets

METHOD AND APPARATUS FOR SELECTING THE BEST FIXED COMMUNICATION UNIT

This is a continuation of application Ser. No. 08/035,109, filed Mar. 19, 1993 and now abandoned.

FIELD OF THE INVENTION

This invention relates in general to communication systems, and more specifically to a method and apparatus for selecting the best fixed communication unit.

BACKGROUND OF THE INVENTION

Communications systems having a plurality of portable communication units (PCU) and at least two fixed communication units (FCU) encounter difficulties in obtaining or selecting the optimum (or best) communication links. For example, in a standard Cordless Telephone (CT2) system, when a portable communication unit (PCU) requests a communication link, the first FCU to detect the request will grant the communication link for communicating with the requesting PCU. Unfortunately, due to the random timing of the channel scanning by the FCUs, the first FCU to detect the request may not be the closest to the requesting PCU. That is, it is not the "best" or optimum FCU to grant the link for facilitating communication with the requesting PCU.

Several methods have been proposed for selecting the "best" FCU in a CT2 system. Unfortunately, all the proposed methods have some drawbacks. A first suggested method, upon a request for a communication link by a PCU, is to allow the FCU to grant a communication link immediately only when the absolute received signal strength is above a threshold value. With this method, if no received signal strength is above the threshold value after the passage of a fixed time limit, the FCU will lower its threshold value for allowing the granting of the communication link if the PCU is still requesting a communication link. However, with this method, the FCU will answer the communication link request if it received the communication link request above the threshold value and will automatically grant the communication link. Therefore, the first method does not ensure the selection of the best FCU, it merely increases the probability of best FCU selection. On the other hand, if at least two FCUs are scanning the channels and the at least two FCUs are receiving the communication link requests at signal strengths above the threshold value, and if the FCU having the weakest signal receives the communication link request first, it is more probable that the FCU having the weakest signal strength will grant the communication link.

A second proposed method was always to require a high threshold signal strength before granting the link, however, this technique prevents a distant FCU from granting the communication link when another FCU is nearer. Unfortunately, this method also prevents a distant FCU from granting the link even if the distant FCU is the only base receiving the communication request. This technique accomplishes strong FCU selection at the expense of reduced system range.

A third proposed method was to reduce the FCU output power during the transmission of the communication link grant message. The theory is that if the PCU is unable to hear the weak link grant, the PCU will continue to request a link until a more proximate FCU (if any) scans the channel, hears the request, and grants the link. Like the second method, this method works fairly well if there is a FCU sufficiently proximate to the PCU. Unfortunately, it has the same drawback of preventing a farther FCU from granting the communication link even if the farther FCU is the only FCU, thus again accomplishing strong FCU selection at the expense of reduced system range. This drawback can be overcome by designing the FCU so that it "remembers" the first communication link request. Then when the FCU receives a second link request thereafter from the same portable on a different channel, the FCU will interpret that to mean that no other FCU was able to grant the communication link. The FCU then returns to a full-power to grant the communication link. Like the first method, this two-level approach does not ensure the selection of the best FCU, but merely increases the probability of selecting the best FCU. Due to lack of synchronous channel scanning, the timing problems affecting below-threshold FCU in the first method still applies. For example, consider when two FCUs are in range of the PCU with one much closer than the other, but both sufficiently distant to cause the PCU to receive their response at the low power level. In this case, the FCU that scans the channel first will be the FCU that grants the communication link at the higher power level irrespective of whether that FCU is best suited among the two FCUs.

Thus what is needed is a method for automatically selecting the FCU that is best suited for granting the communication link to the requesting PCU.

SUMMARY OF THE INVENTION

A portable communication unit capable of communicating on a plurality of communication channels. The portable communication unit includes a method for selecting one of an at least two fixed communication units for communicating therewith. The method comprising the steps of:

(a) transmitting communication link requests;

(b) receiving link grant responses from the fixed communication units receiving the communication link requests;

(c) transmitting wait signals for delaying communication to the fixed communication units responding to the communication link requests;

(d) measuring and storing signal strengths of the link responses received from the fixed communication units responding to the communication link requests;

(e) selecting the fixed communication unit having a maximum measured received signal strength of the link grant response; and (f) initiating communication with the fixed communication unit having the maximum received signal strength.

A portable communication unit capable of communicating on a plurality of communication channels and selecting one of an at least two fixed communication units for communicating therewith comprises means for transmitting communication link requests and means, coupled to the transmitting means, for receiving link grant responses from the fixed communication units receiving the communication link requests. The transmitting means, in response to the receipt of the link grants, transmits wait signals for causing the fixed communication units to delay communication therewith. A means, coupled to the receiving means, measures and stores signal strengths of each link grant signal received from the fixed communication units responding to the communication link request. A means, coupled to the measuring and storing means, selects the fixed communication unit having the link grant signal with a maximum measured received signal strength, and a means, coupled to the selecting means, initiates communication with the fixed communication unit having the maximum received signal strength.

DESCRIPTION OF A PREFERRED EMBODIMENT

Figure 1:
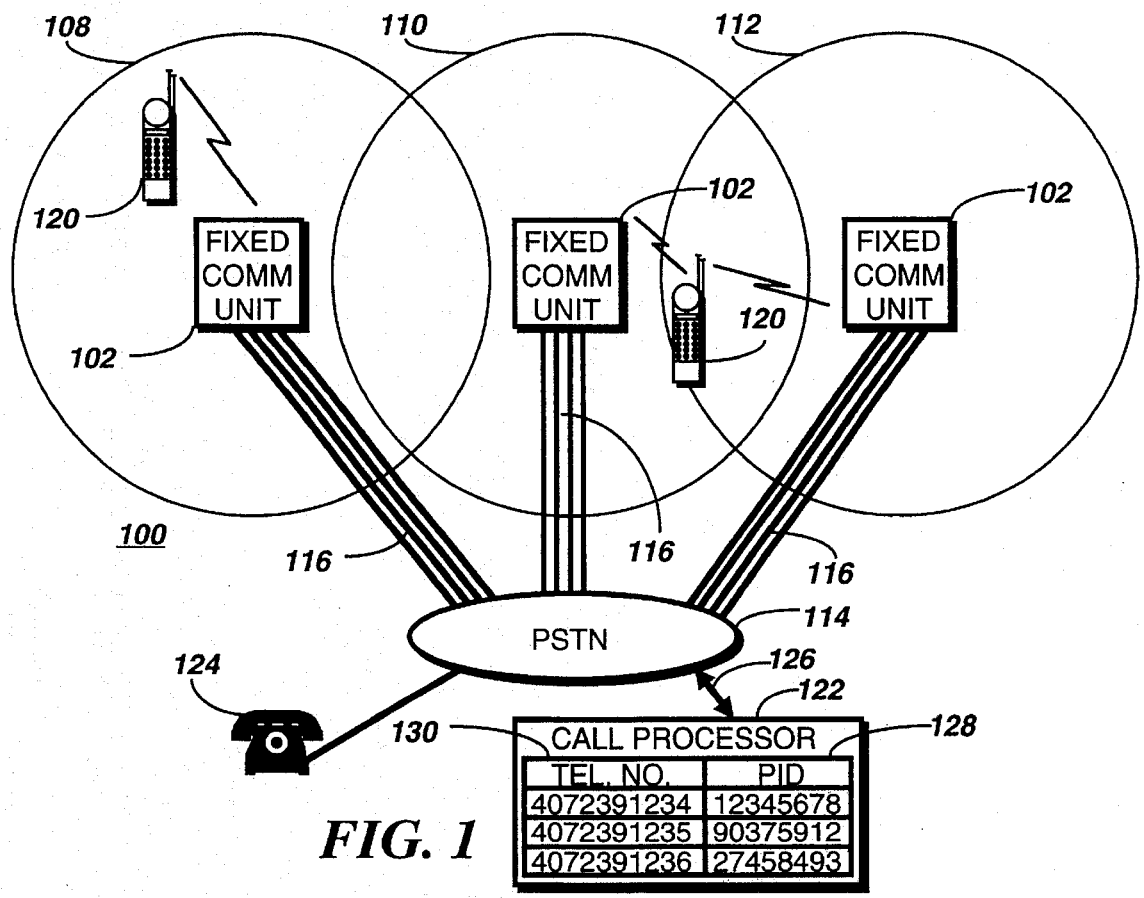
FIG. 1 is an electrical block diagram of a communication system in accordance with a preferred embodiment of the present invention.

With reference to FIG. 1, an electrical block diagram of a wireless communication system in accordance with a preferred embodiment of the present invention is shown. The wireless communication system 100 is, for example, a two-way wireless communication system that supports inbound calling from a public switched telephone network (PSTN). Examples of such systems include cellular telephone systems and trunked radio systems. Also becoming well known are city-wide telepoint systems based on second generation cordless telephony (CT2) technology. This latter technology provides service within small, isolated "islands of coverage" each defined by a limited radio coverage range provided by one or more fixed communication units located therein. Unlike cellular telephone systems and trunked radio systems, CT2 city-wide telepoint systems, typically have hundreds or even thousands of fixed communication units, each individually interconnected with the public switched telephone network.

As illustrated, the wireless communication system 100 preferably comprises the CT2 communication system which further comprises a plurality of fixed communication units (FCU)102 that provide radio coverage in a plurality of islands of coverage 108, 110, 112. The fixed communication units 102 are coupled to the Public Switched Telephone Network (PSTN) 114 by a plurality of telephone lines 116 comprising both voice and data channels. The wireless communication system 100 according to the present invention can also be used with telephone systems other than the public switched telephone network, e.g., a private branch exchange (PBX).

The CT2 communication system 100 also comprises a plurality of portable communication units (PCU) 120 and at least one wired telephone set 124. Both the portable communication units 120 and the wired telephone set 124 are designated for sending and receiving calls between one another. The portable communication units 120 may also communicate with another portable communication unit 120 through one or more of the fixed communication units 102. A call processor/controller 122 coupled to the wireless communication system 100 via the PSTN 114 controls calls inbound to the portable communication units 120, and controls the public switched telephone network 114 for performing call routing in a manner well known in the art. The call processor 122 is also coupled to the plurality of fixed communication units 102 and to the public switched telephone network 114 by at least one data channel 126. The data channel 126 provides call routing for data communications between the public switched telephone network 114, the call processor 122, and between the plurality of fixed communication units 102 and the call processor 122. The call processor 122 comprises a database containing a plurality of values of telephone numbers 130 assigned to each of the plurality of portable communication units 120. The telephone numbers 130 are utilized for receiving inbound calls from the public switched telephone network 114, and each corresponding portable communication unit is assigned a portable communication unit identification code (PID) 128.

As illustrated, when a portable communication unit 120 is located in an area such that more than one fixed communication unit receives the communication link request from the portable communication unit, it is important that the FCU transmitting a link grant signal with the maximum measured signal strength to the requesting PCU be chosen from among all the other FCUs 120 that have responded to the communication link request. In this way, the "best" FCU is chosen which insures that the best communication link is obtained between the requesting PCU and selected FCU. According to the preferred embodiment, the "best" FCU is selected by measuring the received signal strength at the PCU of all the FCUs and selecting the FCU which has the highest measured signal strength.

Figure 2:
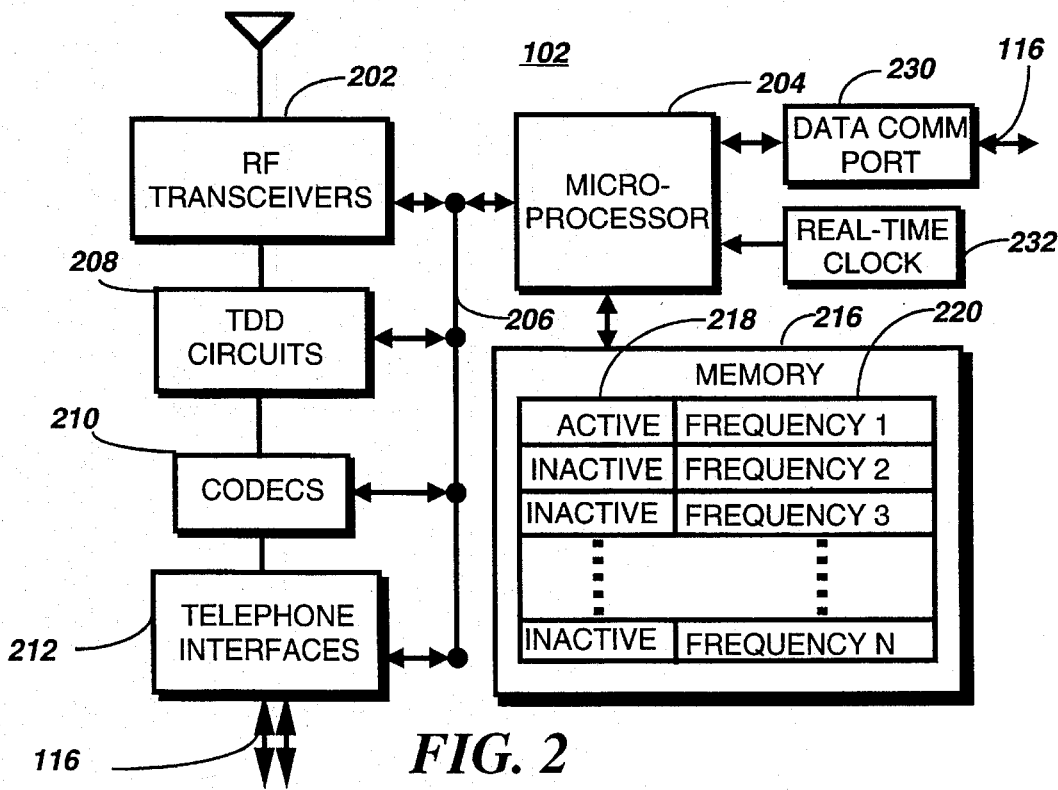
FIG. 2 is an electrical block diagram of a fixed communication unit (FCU) in accordance with the preferred embodiment of the present invention.

Referring to FIG. 2, a block diagram of the fixed communication unit 102 in accordance with the preferred embodiment of the present invention is shown. The fixed communication unit 102 comprises a plurality of radio frequency (RF) transceivers 202 for transmitting and receiving radio signals comprising digital information transmitted and received in a frequency-division-multiple-access (FDMA) and time-division duplex (TDD) format. According to the preferred embodiment of the present invention, the RF transceivers 202 also receive a delay signal being sent from a portable communication unit 120 that had requested a communication link. However, before the PCU 120 accepts or begins to communicate on the offered communication link, it sends the delay signal to each responding FCU before the PCU decides which is the best FCU 102 by measuring the RSSI of each FCU 102 responding to the communication link request. The plurality of RF transceivers 202 are coupled to a microprocessor 204 for controlling the plurality of RF transceivers 202 by a bus 206. The microprocessor 204 is preferably an MC68302 generation of microcomputers, such as manufactured by Motorola, Inc. The microprocessor 204 is coupled to a data communication port 230 for communicating with the call processor 122 (FIG. 1) through the public switched telephone network 114 by at least one of the plurality of telephone lines 116. The microprocessor 204 is also coupled to a real time clock 232 for providing real time values for timing operations in the fixed communication unit 102. The real time clock 232 provides timing functions for enabling the FCU 102 to delay for a period of time when the fixed communication units 102 receive the delay signal from the portable communication unit 120 responding to the fixed communication unit's communication link grant, the detail of which will be discussed below.

The plurality of radio frequency (RF) transceivers 202 are also coupled to a plurality of time-division duplex (TDD) circuits 208 for interfacing the plurality of RF transceivers 202 to a plurality of CODECs 210. The plurality of CODECs 210 perform audio-to-digital and digital-to-audio conversions of signals transmitted and received, respectively, by the fixed communication unit 102. The plurality of CODECs 210 are coupled to a plurality of telephone interfaces 212 for coupling a portion of the plurality of telephone lines 116 to signals comprising voice communications from the plurality of CODECs 210. It is also possible in certain telephone systems, e.g., with an Integrated Services Digital Network system (ISDN), to carry both the data from the data communication port 230 and the signals comprising voice communications from the plurality of telephone interfaces 212 on the same telephone line 116.

The plurality of time-division duplex circuits 208, the plurality of CODECs 210, and the plurality of telephone interfaces 212 also are all coupled to the bus 206 for receiving control signals from the microprocessor 204. A memory 216 is also coupled to the microprocessor 204 for storing program control software and for storing values indicating the plurality of communication channels 220 that are available to be assigned or granted (e.g., active or inactive channels) 218 for communication in response to a communication link request from the PCU 120.

In this fashion, the FCU, upon receipt of a communication link request from the PCU, sends a communication link grant to the PCU that sent the communication link request. The PCU, upon receipt of the link grant, transmits a delay signal to the FCU which delays further communication with the FCU until the PCU has received more communication link grants from other in-range FCUs. Upon receipt of at least two link grant, the PCU, by comparing RSSI of each communication link grant received, selects the FCU which transmitted the communication link grant having the maximum signal strength.

Figure 3:
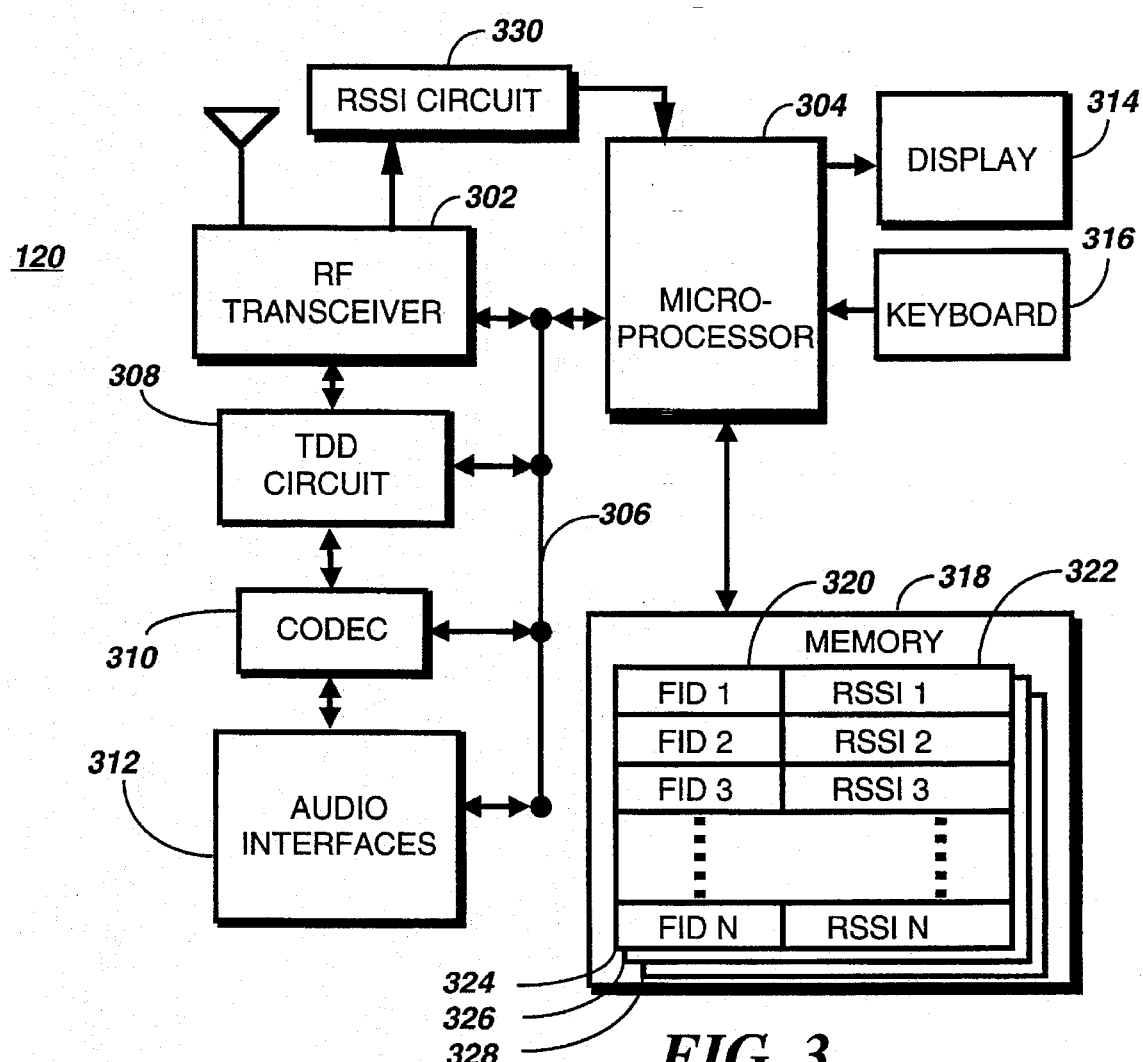
FIG. 3 is an electrical block diagram of a portable communication unit (PCU) in accordance with the preferred embodiment of the present invention.

Referring to FIG. 3, an electrical block diagram of the portable communication unit 120 in accordance with the preferred embodiment of the present invention is shown. The PCU 120 comprises an RF transceiver 302 for transmitting and receiving radio signals comprising digital information transmitted and received in a frequency-division multiple-access and time-division duplex format (FDMA/TDD). The RF transceiver 302 is coupled to a microprocessor 304 for controlling the RF transceiver 302 over a bus 306. The RF transceiver 302 is also coupled to a time-division duplex circuit 308 for interfacing the RF transceiver 302 to a CODEC 310. The CODEC 310 performs audio-to-digital and digital-to-audio conversions of signals transmitted and received, respectively, by the portable communication unit 120. The CODEC 310 is coupled to audio interfaces 312 for sending and receiving audio signals to and from a user of the portable communication unit 120. The time-division duplex circuit 308, the CODEC 310, and the audio interfaces 312 also are all coupled to the bus 306 for receiving control and data information to and from the microprocessor 304. An RSSI circuit 330 is coupled to the RF transceiver 302 and the micro-processor 304 measures the signal strength of the received signal of each FCU 102 responding to the PCU communication link request in a manner well known to one of ordinary skill in the art. The measure signal strength values are stored via the microprocessor 304. A memory 318 is also coupled to the microprocessor 304 stores program control software, and the measured RSSI values 322 and FCU identification numbers (FID) 320 in, for example, a plurality of queue memory pages 324, 326, 328, each corresponding to one of the plurality of fixed communication units 102 that has responded to the communication link request. Each of the plurality of queue memory pages 324, 326, 328, as illustrated, contains the plurality of memory location pairs 320, 322 reserved for storing values representing fixed communication unit identification codes (FIDs) 320 and corresponding measured values of received signal strength indicators (RSSI) 322, respectively. The two corresponding values in each of the plurality of memory location pairs 320, 322 are associated with a corresponding one of the plurality of the fixed communication units 102 in accordance with the preferred embodiment as described further herein below. Also coupled to the microprocessor 304 is a display 314 for displaying information sent from the microprocessor 304 and a keyboard 316 for receiving control input from the user.

Therefore, when the portable communication unit 120 is located in an area such that more than one fixed communication units receive the communication link request from the portable communication unit, it is important that the "best" FCU, e.g., the FCU having the strongest link grant signal that responded to the requesting PCU, be chosen from among all the other FCUs 120 that have responded to the communication link request. According to the preferred embodiment of the present invention, the portable communication unit measures the RSSI of each fixed communication unit that responds to the PCU, and selects the FCU that has the maximum measured RSSI as having the "best" communication link. This FCU is therefore the "best" FCU for granting the communication link to the PCU. Thus, the "best" FCU is selected by measuring the received signal strength at the PCU of all the FCUs and selecting the FCU which has the highest measured signal strength.

The protocol used in the wireless communication system according to the present invention operates substantially in accordance with the requirements of the CT2 Common-Air-Interface (CAI) standard well known to one of ordinary skill in the art, although other wireless communication systems based on other protocol standards can also benefit from the present invention. The CT2 Common-Air-Interface standard also allows a fixed communication unit to poll for a pre-programmed group up to thirty-two portable communication unit identification codes on a single channel in response to a single inbound call. This "group calling" capability is provided to allow a single privately owned, e.g., residential, fixed communication unit to cause a pre-programmed group of portable communication units each to generate an alert at the start of an inbound call. The first portable communication unit to answer its alert is then connected to the call.

Figure 4:
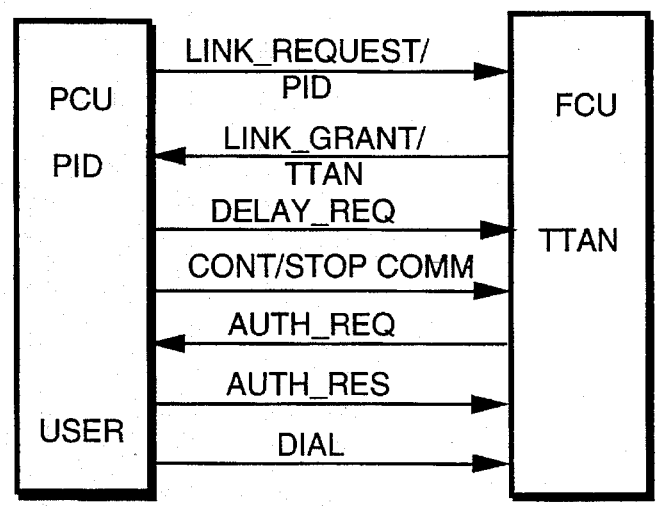
FIG. 4 is an example of the signal flow relating to the preferred operation of the communication system of FIG. 1.

For a more detailed description of the invention, reference is directed to FIG. 4, an example of the signal flow diagram necessary to provide communication between, for example, a PCU 120 and a FCU 102 in accordance with the present invention. The portable communication unit (PCU) 120 is assigned a unique portable identification number, PID which identifies the PCU, in a manner well known for use in CT-2 cordless telephone systems. Similarly, the fixed communication unit FCU 102, as shown, is assigned a unique telepoint telephone access number, TTAN, which enables inbound communication access to each FCU 102. While only one portable communication unit and one fixed communication unit are illustrated in FIG! . 4, the operation of the wireless communication system 100 in accordance with the preferred embodiment of the present invention can also be applied to a greater number of portable communication units and fixed communication units.

In the description of the signal flow which is provided in

FIG. 4, it will be appreciated that only those signal items which are specifically related to the operation of the wireless communication system in accordance with the preferred embodiment of the present invention will be described in detail. A description of the complete signaling protocol which is utilized in CT-2 cordless telephone systems can be found in the Common Air Interface Specification MPT 1375 published by the Department of Trade and Industry in London, England, dated Jun. 30, 1991.

Figure 5:
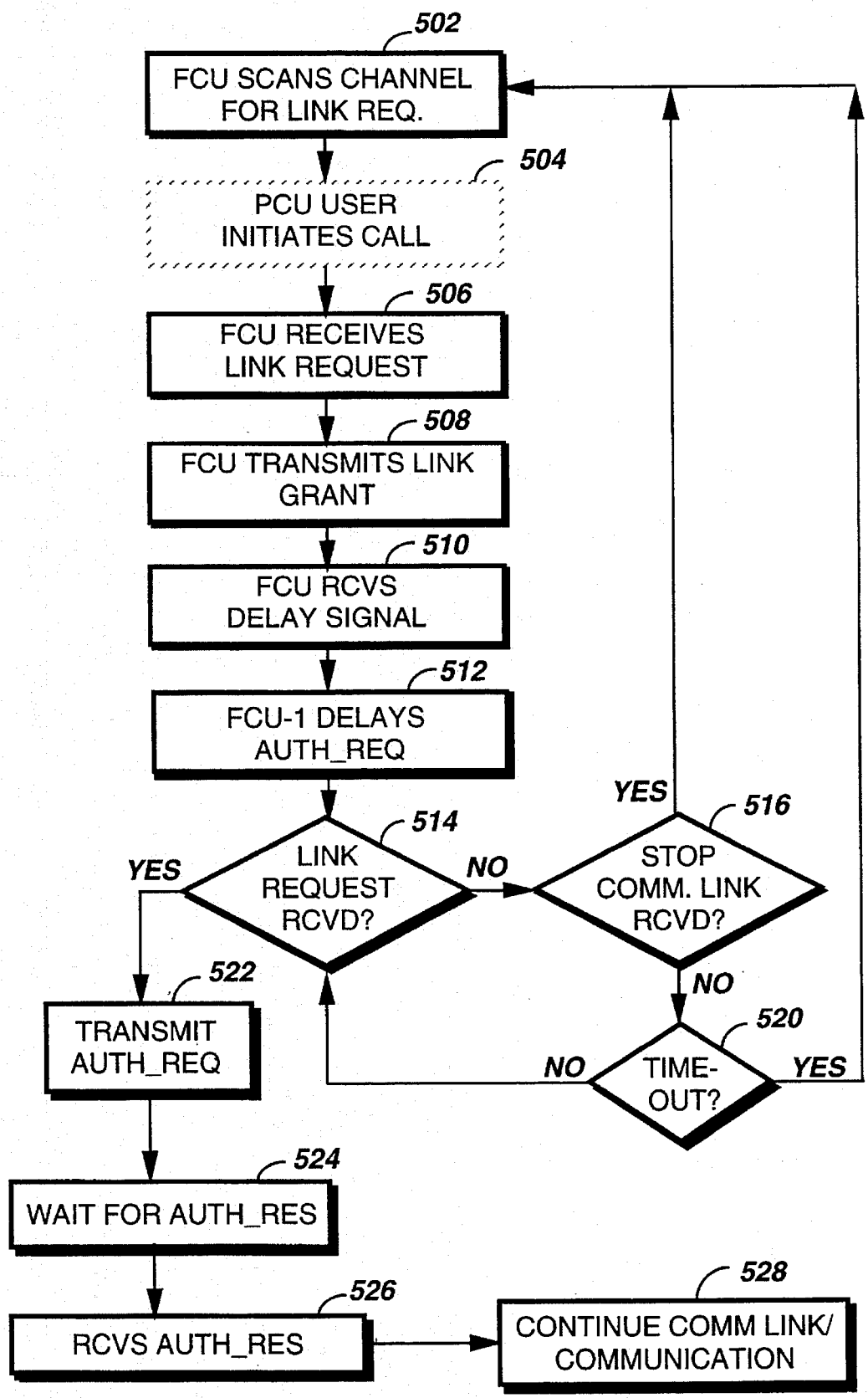
FIG. 5 is a flow diagram illustrating the operations of the fixed communication units in accordance with the preferred embodiment of the present invention.
Figure 6:
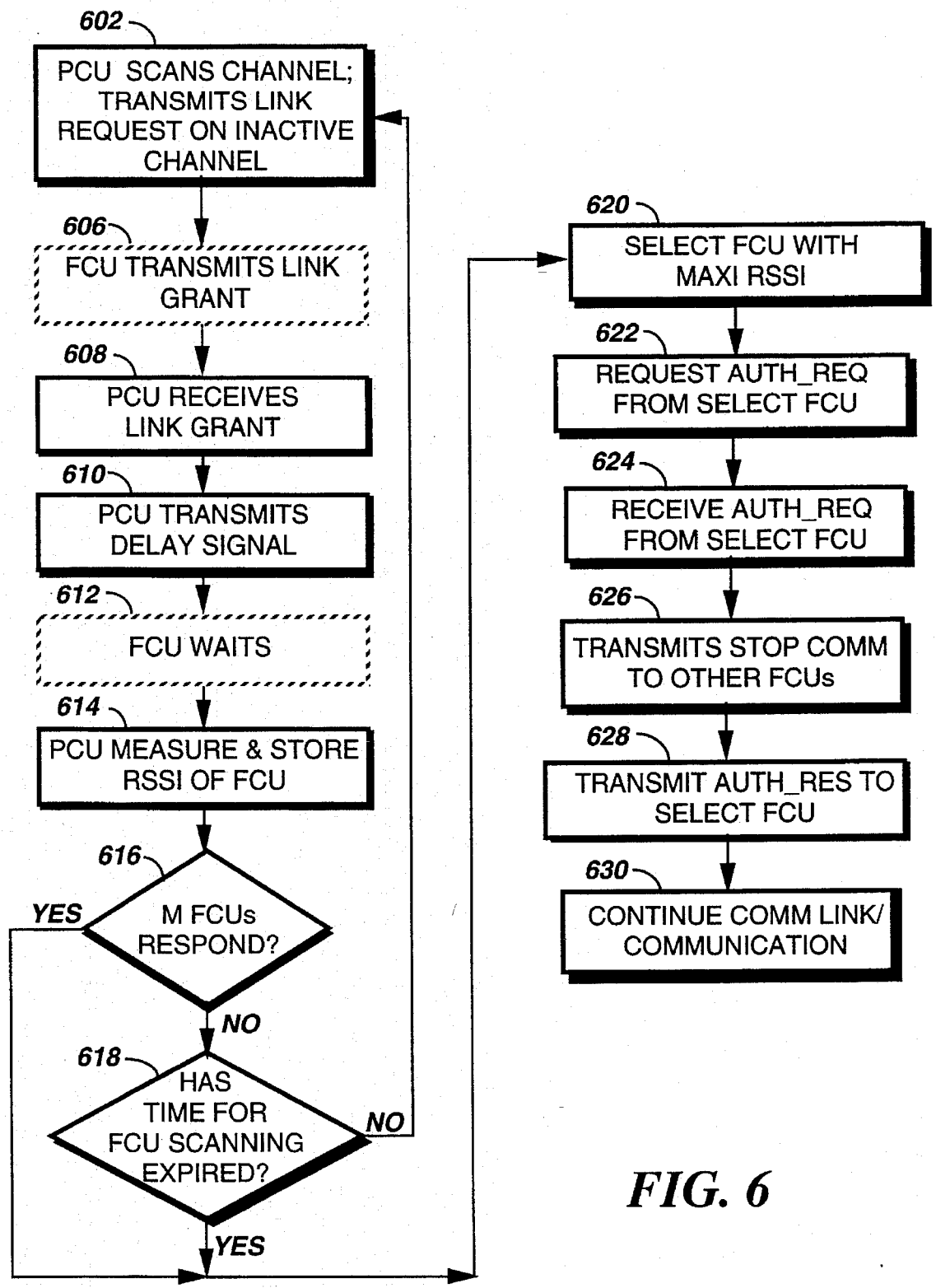
FIG. 6 is flow diagram illustrating the operation of the portable communication units in accordance with the preferred embodiment of the present invention.

The signal flow diagram of FIG. 4 is best understood when considered in conjunction with the flow diagrams of FIGS. 5 and 6 Referring first to FIG. 4 in conjunction with FIG. 5, the flow diagram illustrating the FCU call handling operations in accordance with the preferred embodiment of the present invention. Operationally, the FCU 120 scans the plurality of communication channels for receiving communication link requests, LINK_REQUEST, from at least one of the PCUs, block 502. When a PCU user, USER, initiates a call, at block 504, the call can be directed to a second portable communication user or a tethered telephone user connected to the FCU 102. The PCU 120 initially transmits the communication link request, LINK_REQUEST, on an inactive communication channel, the communication link request including the PCU's identification number PID encoded therein in a manner well known to one of ordinary skill in the art. The FCU 102 receives the communication link request, block 506, and transmits a link grant, LINK_GRANT, which includes the TTAN access number encoded therein in a manner well known to one of ordinary skill in the art, block 508. The communication link grant is generally followed by an authorization request, AUTH_REQ, which is used in the user authentication process.

However, in accordance with the preferred embodiment of the present invention, the FCU delays automatic transmission of the AUTH_REQ, and the PCU, upon receipt of the communication link grant, transmits a delay (or wait) signal, DELAY$_{13}$REQ, to the FCU identified by its TTAN access number. It can be appreciated by one of ordinary skill in the art that before the wait signals are transmitted, the wait signals are encoded with an identifying code, for example an address, for identifying the portable communication unit transmitting the wait signal. When the FCU receives the delay signal, block 510, the FCU suspends further call initiation communication with the PCU, which causes the FCU to further delay its transmission of the AUTH_REQ for either a pre-determined time, or until the FCU has received a request from the PCU to transmit the AUTH_REQ, or to stop further call initiation communication by not transmitting the AUTH_REQ, block 512. The FCU, after receiving the delay signal, continues checking to determine when the request to transmit the AUTH_REQ from the PCU is transmitted, block 514. If the request for AUTH_REQ is not received, the FCU then checks to determine if a stop communication link signal, STOP COMM, is received from the PCU, block 516. If yes, the FCU continues to block 502 to scan the plurality of communication channels for receiving other communication link requests. Alternately, at block 516, when the stop communication link signal is not received, the FCU checks if a time-out period has expired, block 520. If yes, the FCU continues to block 502 for scanning the plurality of communication channels for other communication link requests. However, if the time out period has not expired, block 520, the FCU continues to check if the request to transmit the AUTH_REQ is received from the PCU, block 514.

When the FCU receives the request for transmission of the authorization request, AUTH_REQ, block 514, the FCU transmits the AUTH_REQ to the identified PCU, block 522. The PCU, upon reception of the AUTH_REQ will transmit an authorization response, AUTH_RES to the FCU, block 524. The FCU, upon receipt of the authorization response, AUTH_RES, (BLOCK 526) continues the communication link with the PCU that requested the link, block 528. During block 528, the FCU generates a dial tone which is received by the PCU user, USER, indicating the user can now dial the telephone number for which the call is directed. The PCU user, USER, then keys in the digits corresponding to the telephone number. The telephone number may correspond to a telephone number for a conventional telephone receiver, or to a second PCU.

Reference is now directed to FIG. 4 in conjunction with FIG. 6, a flow diagram illustrating the PCU operations in accordance with the preferred embodiment of the present invention. Operationally, the PCU begins by scanning the plurality of communication channels until an inactive communication channel is located, and transmits the communication link request on the inactive communication channel, block 602. There may be more than one FCU in communication range of the requesting PCU resulting in more than one FCU capable of receiving the communication link request (see FIG. 1). The first FCU 120 that receives the communication link request thereafter will most likely be the FCU to transmit the first communication link grant to the requesting PCU, block 606. It will be appreciated by one of ordinary skill in the art that the FCU best suited for communicating with the requesting PCU may not receive the communication link request first. All the FCUs randomly scan the plurality of communication channels, therefore the best FCU may be listening to a different communication channel from the communication channel the communication link request is being transmitted on. In this way, there is no control on which FCU receives the communication link request, therefore, this invention allows the PCU to transmit more than one communication link request of different communication channels, and to receive more than one communication link grant from more than one FCU so that the PCU can decide which FCU is "best" suited for communicating therewith.

The PCU receives the link grant, block 608, and transmits a delay (or wait or delay request) signal, DELAY$_{13}$REQ, to the FCU that transmitted the communication link grant. The FCU is identified by decoding the TTAN access code being transmitted by the FCU with its transmission of the communication link grant, LINK_GRANT, block 610. The FCU, upon receipt of the DELAY$_{13}$REQ transmitted from the PCU, suspends further operation relating to the requesting PCU and waits until either a predetermined time, or until the FCU has received another request from the PCU to transmit the AUTH_REQ, or to stop further call initiation communication by not transmitting the AUTH_REQ, block 612. As described above, the PCU measures the received signal strength, RSSI, of the LINK_GRANT and stores the measure RSSI value tagged with an identification to the FCU, for example, the fixed communication identification number (FID), block 614. The PCU then checks if a predetermined number of FCUs have responded, block 616, for example, the predetermined number, M, may be the total number of RSSI values that can be stored in memory. It can therefore be appreciated that the predetermined number can be based on any other system determination. If the predetermined number of FCUs have not responded, the PCU checks, for example an elapse time period to determine when the time has elapsed for the FCUs to scan the N number of communication channels (the plurality of communication channels), block 618. The PCU knows the time it takes each FCU to scan through and listen on the plurality of communication channel for determining when a PCU is transmitting a communication link request. N refers to the plurality of communication channels of the communication system. If the time has not elapsed for the FCU to scan the plurality of communication channels, the PCU continues to block 602 to transmit another communication link request on the same or a different communication. According to the preferred embodiment, the PCU transmits the communication link requests of the same communication channels. However, when the predetermined number, M, of FCUs have responded, block 616, or when the time has expired for the FCU to scan the N number of channels, block 618, the PCU selects the "best" FCU, of all the FCUs that have responded, to communicate therewith. The "best" FCU preferable comprises the FCU that transmitted the LINK GRANT with the maximum measured received signal strength. It can be appreciated by one of ordinary skill in the art that the "best" FCU may be selected on other factors as well. For example, the "best" FCU is chosen by determining when one of the plurality of communication channels has a threshold activity below a predetermined value. As is well known by one skilled in the art, the lower the threshold activity on a communication channel, the higher the received signal to noise ratio. Therefore, the signal to noise ratio is inversely proportional to the channel activity because a low threshold activity indicates a high signal to noise ratio. After selecting the best FCU, the PCU transmits a request for further communication, for example the request for the authorization request, CONT, to the selected ("best") FCU, block 622. The PCU then receives the AUTH_REQ from the selected FCU, block 624, and transmits a response, AUTH_RES, to the selected FCU after receiving the AUTH_REQ, block 626. The PCU then or simultaneously with the transmission of the AUTH_RES transmits stop communication signals, STOP COMM, to the other FCUs that were not selected, and further communication continues with the selected FCU, block 630. It can be appreciated by one of ordinary skill in the art that the signal can be encoded with the AUTH_RES addressed to the selected FCU and the STOP COMM addressed to the nonselected FCU. Alternately, the PCU may transmit more than one signal to achieve the same objective.

In this way, the preferred embodiment of the present invention provides a way for the PCU to select the best FCU by comparing the signal strengths of all the FCUs that have responded and are within range. It overcomes the above mentioned problems with the prior art by selecting the "best" FCU by selecting the FCU that transmitted the communication link grant having the maximum measured received signal strength. Therefore, by using a single RSSI (that of the PCU) to determine the signal strengths of all possible links, measurement variations are eliminated. Second, by comparing signal strengths, the portable communication unit can pick the best signal without regard to any absolute threshold, so long as the signal is within the operating range of the RSSI. Third, because the portable communication unit originates the link request, it can wait exactly long enough for all in-range fixed communication units to scan the channel and respond to the link request thereby enabling the portable communication unit to make its decision based on the relative strengths of the responses, knowing that it has received all of the possible responses.

In summary, there is provided a communication system having at least two fixed communication units for communicating with an at least one of a plurality of portable communication units. The at least two fixed communication units and the at least one portable communication units is a capable of communicating on a plurality of communication channels. The at least two fixed communication units comprises transceiving means for transmitting and receiving communication and control signals. A means, coupled to the transceiving means, for scanning the plurality of communication channels and means, coupled said transceiving means, for processing communication link requests, and for granting a communication link to the requesting portable communication unit for initiating communication therewith. The portable communication unit comprises means for transmitting a communication link request on one of the plurality of communication channels. A means for receiving the link grant from one of the at least two fixed communication units receiving the communication link request, and means, coupled to the receiving means, for measuring and storing a signal strength of the link grant from each of the fixed communication units. The transmitting means coupled to the measuring means transmits a delay signal to each of the fixed communication units for delaying communication. A means, coupled to the transmitting means, scans communication channels for enabling the transmitting means for transmitting communication link request. A means, coupled to the measuring and storing means, determines the fixed communication unit transmitting the communication link grant having a maximum measured received signal strength; and a means, coupled to said determining means, activates communication with the fixed communication unit having the maximum received signal strength.

I claim:

1. A portable communication unit capable of communicating on a plurality of communication channels, the portable communication unit including a method for scanning the plurality of communication channels for selecting a best fixed communication unit of an at least two fixed communication units for communicating therewith, the method for initiating communication comprising the steps of:

(a1) scanning the plurality of communication channels for initiating communication;

(a) transmitting a communication link request;

(b) receiving a link grant response from a fixed communication unit receiving the communication link request;

(c) measuring and storing a signal strength of the link grant response received from the fixed communication unit responding to the communication link request;

(d) transmitting a wait signal for delaying communication with the fixed communication unit responding to the communication ink request, the portable communication unit repeats step (a1) through step (d) for initiating communication with another of the at least two fixed communication units;

(e) selecting the fixed communication unit having a maximum measured received signal strength of the link grant response as the best fixed communication unit; and (f) initiating communication with the best fixed communication unit.

2. The method for selecting the fixed communication unit according to claim 1 further comprising the step of:

(g) determining one of the plurality of communication channels having a threshold activity below a predetermined value for transmitting the communication link request.

3. The method for selecting the fixed communication unit according to claim 1 wherein the step of selecting the best fixed communication unit further comprising the steps of:

(g) transmitting a request for authorization to the best fixed communication unit; and (h) transmitting a stop communication signal to the fixed communication units not having the maximum measured signal strength.

4. The method for selecting the fixed communication unit according to claim 1 wherein the step of transmitting the wait signal further comprising the step of encoding an identifying code for identifying the portable communication unit.

5. A fixed communication unit being able to communicate on a plurality of communication channels, the fixed communication unit including a method for delaying communication with a portable communication unit, the method comprising the steps of:

(a) receiving a communication link request from a requesting portable communication unit on one of the plurality of communication channels;

(b) transmitting a link grant signal in response to the communication link request;

(c) receiving a wait signal from the requesting the portable communication unit in response to the transmission of the link grant signal; and (d) delaying communication with the requesting portable communication unit in response to the wait signal while said portable communication unit scans through the plurality of communication channels for initiating communication with other fixed communication units to select a best fixed communication unit as the fixed communication unit having a maximum measured signal strength.

6. The method according to claim 5 wherein the step of delaying further comprising:

(e) checking when a request for authorization request signal is received from the requesting portable communication unit; and (f) initiating a timer for suspending further communication with the requesting portable communication unit for a predetermined time period in response to step (e) not receiving the request for authorization request signal.

7. The method according to claim 5 further comprising the step of continuing establishing communication with the requesting portable communication unit in response to a receipt of a request for authorization signal from the requesting portable communication unit.

8. The method according to claim 5 further comprising the step of sequentially scanning the plurality of communication channels for receiving communication link request.

9. A communication system comprising at least two fixed communication units for communicating with at least one of a plurality of portable communication units, the at least two fixed communication units and the at least one portable communication unit being able to communicate on a plurality of communication channels, the at least one portable communication unit including a method for initiating communication with the at least two fixed communication units for communicating therewith, the method of initiating communication comprising the steps of:

(a1) scanning the plurality of communication channels for selecting a best fixed communication unit;

(a) transmitting a communication link request;

(b) receiving a link grant signal from at least one of the at least two fixed communication units receiving the communication link request;

(c) measuring and storing a signal strength of the link grant signal;

(d) transmitting a wait signal to the fixed communication unit transmitting the link grant signal, the portable communication unit repeats step (a1) through step (d) for selecting the best fixed communication unit;

(e) determining the fixed communication units responding with the link grant signal having a maximum measured signal strength as the best fixed communication unit; and (f) establishing the communication link with the best fixed communication unit.

10. The method according to claim 9 wherein said step (a) transmits communication link requests in response to step (b) receiving a predetermined number of link grant signals from the at least two fixed communication units responding to the communication link requests being transmitted.

11. The method according to claim 9 wherein said step (a) of transmitting transmits communication link grants requests to the at least two fixed communication units in response to a time for scanning the plurality of communication channels.

12. A portable communication unit capable of communicating on a plurality of communication channels by scanning the plurality of communication channels for initiating communication with an at least two fixed communication units, the portable communication unit, comprising:

means for scanning the plurality of communication channels for selecting a best fixed communication unit;

means for transmitting a communication link request;

means, coupled to the transmitting means, for receiving a link grant response from a fixed communication unit receiving the communication link request;

means, coupled to the receiving means, for measuring and storing a signal strength of the link grant signal received from the fixed communication unit;

said transmitting means, in response to the receipt of the link grant, for transmitting a wait signal for causing the fixed communication unit to delay communication therewith;

means, coupled to the measuring and storing means, for selecting the fixed communication unit having the link grant signal with a maximum measured received signal strength as a best fixed communication unit; and means, coupled to the selecting means, for initiating communication with the best fixed communication unit.

13. The portable communication unit according to claim 12 further comprising:

means, coupled to the measuring means, for determining a communication channel having a threshold activity below a predetermined value for transmitting the communication link request.

14. The portable communication unit according to claim 12 wherein the selecting means further comprising:

means for initiating said transmitting means for transmitting a request for authorization to the selected best fixed communication unit and transmitting a stop communication signal to the fixed communication units not having the maximum measured signal strength.

15. A fixed communication unit capable of communicating on a plurality of communication channels with a plurality of portable communication units which scan the plurality of communication channels for initiating communication with another fixed communication unit, the fixed communication unit, comprising:

means for receiving a communication link request from a requesting portable communication unit on one of the plurality of communication channels;

means for transmitting a link grant signal in response to the communication link request;

means, coupled to the transmitting and receiving means, for processing the link request;

said receiving means for receiving a wait signal from the requesting the portable communication unit in response to the transmission of the link grant signal; and means, coupled to said processing means and said receiving means, for delaying communication with the requesting portable communication unit in response to the wait signal while said portable communication unit scans through the plurality of communication channels for initiating communication with other fixed communication units to select a best fixed communication unit as a fixed communication unit having a maximum measured signal strength.

16. The fixed communication unit according to claim 15 wherein said processing means further comprising:

means for initiating a timer for suspending further communication with the requesting portable communication unit for a predetermined time period;

means for checking when a request for authorization request signal is received from the requesting portable communication unit; and means, coupled to the checking means, for reinitiating communication with the requesting portable communication unit.

17. A communication system having at least two fixed communication units for communicating with at least one of a plurality of portable communication units, the at least two fixed communication units and the at least one portable communication unit being able to communicate on a plurality of communication channels by scanning the plurality of communication channels, the at least two fixed communication units comprising:

transceiving means for transmitting and receiving communication and control signals;

means, coupled to the transceiving means, for scanning the plurality of communication channels for selecting a best fixed communication unit; and means, coupled said transceiving means, for processing communication link requests, and for granting a communication link to the requesting portable communication unit for initiating communication therewith, said portable communication unit, comprising:

means for transmitting a communication link request on one of the plurality of communication channels;

means for receiving the linkgrant from one of the at least two fixed communication units receiving the communication link request;

means, coupled to the receiving means, for measuring and storing a signal strength of the link grant from each of the fixed communication units;

said transmitting means, coupled to the measuring means, for transmitting a delay signal to each of the fixed communication unit for delaying communication;

means, coupled to said transmitting means, for scanning communication channels for enabling said transmitting means for transmitting communication link request;

means, coupled to said measuring and storing means, for determining the fixed communication unit transmitting the communication link grant having a maximum measured received signal strength as the best fixed communication unit; and means, coupled to said deterring means, for activating communication with the best fixed communication unit.

* * * * *